United States Patent [19]

Weaver et al.

[11] Patent Number: 5,077,246

[45] Date of Patent: Dec. 31, 1991

[54] METHOD FOR PRODUCING COMPOSITES CONTAINING ALUMINUM OXIDE, ALUMINUM BORIDE AND ALUMINUM, AND COMPOSITES RESULTING THEREFROM

[75] Inventors: Samuel C. Weaver; Sally G. Padron, both of Knox County, Tenn.

[73] Assignee: Apollo Concepts, Inc., Knoxville, Tex.

[21] Appl. No.: 532,442

[22] Filed: Jun. 4, 1990

[51] Int. Cl.$^5$ .................. C04B 35/10; C04B 35/58; C22C 29/12
[52] U.S. Cl. .................. 501/98; 501/100; 501/153; 501/96; 75/233; 75/235; 75/244; 419/12; 419/19
[58] Field of Search .............. 423/289; 501/96, 98, 501/99, 100, 153; 420/528; 428/558; 75/244, 135, 233, 235; 252/518; 419/12, 19

[56] References Cited

U.S. PATENT DOCUMENTS

| | | | |
|---|---|---|---|
| 3,503,738 | 3/1970 | Cooper | 75/135 |
| 4,595,559 | 6/1986 | Plenchamp | 420/528 |
| 4,604,368 | 8/1986 | Reeve | 501/98 |
| 4,631,236 | 12/1986 | Roczyn | 428/558 |
| 4,647,405 | 3/1987 | Debely | 252/518 |
| 4,689,077 | 8/1987 | Chevigne et al. | 75/233 |
| 4,755,221 | 6/1988 | Paliwal et al. | 75/244 |
| 4,940,679 | 7/1990 | Claar et al. | 501/99 |

OTHER PUBLICATIONS

Chemial Abstracts–"Chemical Reaction of Boron with Molten Aluminum" Shorshorov et al. *Metalloved Term. Obrab. Met.*, (8), 57–9 (1983)—USSR.
World Aluminum Abstracts "Production of Aluminum-Boron Alloy in Aluminum" Abramov-USSR (3/18/80) SU 908963.

*Primary Examiner*—William R. Dixon, Jr.
*Assistant Examiner*—Paul Marcantoni
*Attorney, Agent, or Firm*—Pitts and Brittian

[57] ABSTRACT

A method for the preparation of ceramic composites containing at least aluminum oxide and aluminum boride, and the composite materials that result from the method. Intimate mixtures of finely-divided powdered aluminum metal and anhydrous boric oxide, with ratios (by weight) of about 0.5 to twenty parts of aluminum metal to one part of boric oxide, are subjected to a temperature to cause a complete reaction between the starting materials. If the ratio is above about 1.25 parts of aluminum to one part of boric oxide, the resultant product will include aluminum in addition to the aluminum oxide and aluminum boride. The ratio is selected to provide the desired hardness and toughness. Ratios between about 1 and 1.2 provide a composite having the highest hardness, with greater amounts of aluminum metal providing increased toughness. Several compositions are described, with hot pressing typically being used to provide the desired heating cycle. Typically, the mixed powders are hot pressed at about 1500 and 1600 degrees C. for about 45 minutes at 6000 psi to produce a product approaching 100% theoretical density. When additional strength is desired, various reinforcing materials can be added to the base mixture, with these reinforcing materials typically being ceramic fibers, whiskers and platelets. The resultant materials will have application as cutting tools, wear parts, armor, insualtion, etc. High yields are achieved, and the method is inexpensive.

7 Claims, No Drawings

METHOD FOR PRODUCING COMPOSITES CONTAINING ALUMINUM OXIDE, ALUMINUM BORIDE AND ALUMINUM, AND COMPOSITES RESULTING THEREFROM

TECHNICAL FIELD

This invention relates generally to the preparation of ceramic composite materials and ceramics, and methods of preparing bodies containing the same, and more particularly to the preparation of composites containing aluminum oxide, aluminum boride and aluminum that exhibit very hard and tough properties.

BACKGROUND ART

In recent years there has been an increasing interest in the manufacture of composite materials, i.e., materials that are made up of more than one constituent mixed into another constituent. Such composite materials have significantly improved the performance of ceramics, metals and plastics. Ceramic composites, for example, have utilized silicon carbide whiskers to reinforce aluminum oxide in order to make cutting tools which significantly outperform competitive materials. With hardness values of 20-22 GPa and toughness values in the range of 6-8 MPa.m$^{\frac{1}{2}}$, the $Al_2O_3$-SiC cutting tools significantly outperform competitive materials, such as tungsten carbide. These advanced composites are claimed to machine nickel-based alloys ten times faster, and last up to twenty-five times as long based on the amount of metal cut.

Silicon carbide whiskers, when added to aluminum, have been shown to provide an improvement in strength up to a factor of three over that exhibited by aluminum alone. Modulus of elasticity improvements of two to two and one half times have been demonstrated. Similar results have been obtained with composites of other metals.

Composite materials are typically manufactured by adding a reinforcement material, such as the silicon carbide, to a baseline starting material referred to as the matrix material. The matrix may be either a metal, a ceramic or a polymeric material. In addition to the silicon carbide reinforcement material, other ceramic materials (or materials that exhibit a ceramic-like behavior) are often used. These tend to have high strength, high modulus of elasticity and low densities. The specific combinations are chosen to provide improvements in strength, stiffness (modulus of elasticity), wear resistance, creep behavior, hardness and higher strength-to-weight ratios. Other properties that can be affected by the choice of the composition are the adjustment of thermal coefficient of expansion, thermal conductivities and total weight.

Although a number of reinforcement materials have been utilized, the most commonly used materials are carbon fibers and silicon carbide whiskers and fibers. A whisker is defined as a single crystal material, and a fiber as a polycrystalline material. Because SiC whiskers do not have any chemical compatibility problems such as those exhibited by carbon fibers in metals and ceramics, these have emerged as the normal reinforcement material of choice for most metal and ceramic composite work.

Some of the prior work in this field of SiC reinforcement is described in U.S. Pat. No. 4,543,345 issued to G. C. Wei that discusses a composition for ceramics with SiC whiskers in alumina, mullite or boron carbide. Another is U.S., Pat. No. 4,652,414 issued to T. Tiegs which describes a refinement of the earlier patent that results in the manufacture of complex shapes; however, the process is rather complex. Still another piece of work in this field is that described in U.S. Pat. No. 4,657,877 issued to P. Becker and T. Tiegs. This describes the use of zirconia and SiC whiskers to produce a product that can be operated at a higher temperature than when only SiC is used.

The use of SiC whiskers is not without problems. One problem encountered by the additions of SiC whiskers is that many of the manufacturing processes produce a submicrometer diameter whisker which is very similar to asbestos in size and shape. Consequently, the manufacturing steps require caution at each step until the whiskers are locked solidly within a composite matrix.

In order to provide the desired benefit to the composite, the SiC whiskers should be smooth and contain no particulates. However, in actual practice, the whiskers almost always contain particulates and clumps of whiskers bonded together. Further, the whiskers often have a rough surface which reduces their effectiveness to toughen a ceramic. When there are particulates or clumps of whiskers, the location of such in the product serves as a crack initiation site. The surface condition of the whisker often adversely affects the strengthening characteristic, with carbon and silicon dioxide being two typical impurities often found in commercial SiC whiskers. This is particularly true when such whiskers are utilized to strengthen an aluminum oxide matrix.

Furthermore, the use of silicon carbide whiskers, due to their cost, results in a rather expensive final product.

In the aluminum industry there are a wide variety of aluminum alloys produced that are "tailored" by chemistry, heat treatment and fabrication techniques for particular uses. Some of the compositions include the addition of boron as alloying agents. Typical of these alloys is that described in U.S. Pat. No. 4,595,559 issued to C. Planchamp on June 17, 1988. This patent discusses the addition of powders of $AlB_2$ or $AlB_{12}$ to molten aluminum to achieve up to 30% boron in the alloy. Another reference in the aluminum-boron art is U.S. Pat. No. 3,503,738 issued to H. S. Booper on Mar. 31, 1970. Potassium borofluoride is reacted with aluminum, and the released boron is alloyed with excess aluminum. This forms a "master alloy" that is used to add boron to aluminum alloys as a grain refiner generally in the presence of titanium.

Other references in this field are: U.S. Pat. No 4,6311,236 issued to H. Rocyzn on Dec. 23, 1986, in which boron-containing powders (e.g. boron carbide) are added to manufacture shapes by powder metallurgy processes, plus extrusion, to produce a core for inclusion within aluminum or aluminum alloys for use as absorbers for nuclear reactors; U.S. Pat. No. 4,604,368 issued to M. Reeve that discusses reacting potassium borofluoride with molten aluminum, and then the boride powder is removed from molten metal by filtering, with the powder subsequently reacted with titanium nitride or titanium hydride to form titanium boride; U.S. Pat. No. 4,647,405 issued to P. E. Debely on Mar. 3, 1987 describes the use of titanium oxide, $B_2O_3$ and aluminum powders to form an alumina-titanium boride composite; and U.S. Pat. No. 4,755,221 issued to M. Paliwal, et. al, on July 5, 1988 describes the use of a plasma to form a composite of titanium boride with aluminum metal.

None of the above-cited references result in a process wherein the composition is a composite that is easily tailored for particular applications where the combinations of hardness and toughness are required. Further, some of the processes are quite hazardous and others are very expensive.

Accordingly, it is an object of the present invention to provide a process for the manufacture of composites containing aluminum oxide, aluminum boride and aluminum.

It is another object of the present invention to provide a process for the strengthening and toughening of aluminum and aluminum alloys that is inexpensive and has a lower health risk than the whisker inclusion technique of the prior art.

It is a further object to provide a process for producing tough ceramic products containing aluminum oxide, aluminum boride and aluminum metal.

An additional object of the present invention is to provide a process for the production of products containing aluminum oxide, aluminum boride and aluminum metal that has a very high yield of product.

Also, it is an object to provide a ceramic composite having at least aluminum oxide and aluminum boride, and typically containing aluminum metal, whose hardness and toughness properties can be easily tailored for a particular application.

These and other objects of the present invention will become apparent upon a consideration of the detailed description of the invention that follows.

SUMMARY OF THE INVENTION

In accordance with the present invention, composites containing aluminum oxide, aluminum boride and typically containing aluminum are prepared in a single firing step. A mixture of powdered anhydrous boric oxide and finely divided aluminum metal powder is prepared by any one of conventional mechanical mixing techniques so as to obtain a uniform mechanical blend of the powders. Typically the blend contains from 1 part aluminum powder in 2 parts boric oxide to about 2 parts aluminum powder in 1 part boric oxide. A typical composition contains about 1.2 parts aluminum to 1 part boric oxide. The mixed powders are shaped by any one of standard ceramic forming techniques. Depending upon the ratios of the starting materials, a final heating (usually under pressure) of 300 to 2000 degrees C. produces the composite having the desired physical characteristics. For example, hot pressing of the above-cited typical composition at 1600 degrees C. for 45 minutes results in a composite which has a hardness greater than 26 GPa and a toughness of about 8 MPa$^{\frac{1}{2}}$ and greater. Increasing the aluminum content results in very tough abrasion resistant ceramics, while compositions of lower aluminum content exhibit increased hardness. The resultant compositions can be utilized alone or in structures where further strengthening is provided with whiskers, fibers and platelets.

BEST MODE FOR CARRYING OUT THE INVENTION

The present invention is typically carried out using, as starting materials, anhydrous boric oxide ($B_2O_3$) and powdered aluminum metal. Anhydrous boric oxide powder is mechanically mixed with, for example, $-325$ mesh aluminum powder to achieve a uniform distribution of the mixed powders. Various conventional mechanical mixing techniques can be used, such as V-blending, ball milling, mechanical stirring, etc. Other techniques will be known to persons skilled in the art: the object is to obtain a very uniform blend of the powders. The relative amounts of the starting materials will be discussed hereinafter.

The blended mixture is typically loaded into a hot press and heated to the appropriate temperature according to the particular mix. Other standard ceramic forming techniques such as cold pressing and sintering, injection molding and sintering, and hot isostatic pressing can be utilized. The resulting reaction is thought to be $$3Al + B_2O_3 \rightarrow Al_2O_3 + AlB_2.$$

Increasing the aluminum over the stochiometric quantity would result in the reaction $$4Al + B_2O_3 \rightarrow Al_2O_3 + AlB_2 + Al.$$

Since the $AlB_{12}$ form of aluminum boride is also stable, it is possible to also have the reaction $$13Al + 6B_2O_3 \rightarrow AlB_{12} + 6Al_2O_3.$$

Because there are peritectic reactions at several temperatures in the Al-B phase diagram, multiple phases of the aluminum borides can be present. Also, at very low ratios of the aluminum-boric oxide, some free boron may exist in the microstructure.

A typical mixture contains 1.2 parts of aluminum powder to one part boric oxide (these are by weight). This particular mixture is typically hot pressed at 1600 degrees C. for 45 minutes at 6000 psi. This resulted in a composite that was 99.6% of theoretical density, had a hardness of 28 GPa and a toughness (as measured by diamond indentation) of 8.3 MPa.m$^{\frac{1}{2}}$. This particular composition is very close to the stoichiometric composition so as to have only $Al_2O_3$ and $AlB_2$ in the microstructure. As a result, it is harder than other composites tested. Lower temperatures can be used on either side of this stoichiometric mixture. Since the starting powders are reacted and sintered in the same step, and in the same shape as a desired part, the process substantially increases the cost effectiveness of the manufactured parts.

Numerous mixtures having different ratios of aluminum metal to boric oxide were prepared and hot pressed. For example a mixture of 1.29 grams of aluminum metal was mixed with 1 gram of boric oxide, then hot pressed at 1600 degrees C. for 45 minutes to achieve a composite that had a density of 99.98% of theoretical. A mixture containing 1.86 grams aluminum powder to 1.0 gram of boric oxide, when hot pressed at 1500 degrees C. for 45 minutes, resulted in a density of 100% of theoretical. Other composites suitable for various applications were prepared using ratios of about 0.5:1 to about 20:1 parts of aluminum powder to boric oxide. However, ratios up to about 100:1 will produce improved products for some applications. Reaction temperatures were varied from about 500 degrees C. to about 1800 degrees C. However, temperatures of about 300 to about 2000 degrees C. are thought to also produce suitable composites. At temperatures greater than about 1200 degrees C., the heating is typically carried out under an inert atmosphere. Compositions having lower ratios (1 to about 1.23) exhibited very high hardness. Compositions wherein the ratio was above 1.25 became increasingly softer, but tougher as the quantity of aluminum in the finished product increased. While for most applications a high density is desired, the reacting of the starting materials can be accomplished without the presence of pressure, or at least with very minimal pressure. Composites formed under low pressure will have a low density and have applications as high temperature insulation.

Since the starting materials are very fine powders, it is easy to mix in various reinforcement materials. For example, whiskers and platelets of boron carbide were mixed with the starting materials to produce a composite which results in $Al_2O_3$, $B_4C$, $AlB_2$ and $Al$. This particular mix is of interest because of the hardness of the boron carbide and the excellent wetting which occurs between the aluminum and the boron carbide. Other known reinforcement materials (e.g., of carbide and nitride whiskers, fibers, platelets) can also be effectively incorporated into the mixture and thus into the finished sintered product.

From the foregoing, it will be understood that a very simple and inexpensive process has been developed to form very hard and tough composites. These products will have wide application as cutting tools, wear parts and other ceramic applications where hardness and toughness are important. Further, the degree of hardness and toughness can be easily varied by the proper choice of the ratio of the starting materials. In addition, such properties as density, modulus of elasticity, thermal coefficient of expansion and electrical resistivity can be adjusted. Also, the addition of further reinforcing materials is easily accomplished.

Although only specific compositions and conditions are discussed herein, the invention is not to be limited by these specifics. Rather, the present invention is to be limited only by the appended claims and their equivalents when read in light of the complete description of the invention herein.

We claim:

1. A hard and tough ceramic composite material of a selected shape consisting essentially of intimately mixed aluminum oxide, aluminum boride and aluminum, said composite material resulting from preparing an intimate mixture, by weight, of about 0.5 to about 20 parts of finely-divided aluminum metal and about one part powdered anhydrous boric oxide, forming said mixture into said selected shape and heating said shaped mixture to a temperature of from about 300 to about 2000 degrees C. for a time sufficient to react said boric oxide and aluminum metal to produce said composite material.

2. The composite material of claim 1 wherein said composite is shaped and heated by hot pressing said mixture at a temperature of about 1400 to about 1800 degrees C. and wherein said mixture of powders comprises, by weight, about 0.5 to about 2 parts of said aluminum metal powder of about $-325$ mesh to about 1 part said boric oxide, said hot pressed composite being greater than 98% of theoretical density and having a hardness greater than about 20 GPa and a toughness of at least 6 $MPa.m^{\frac{1}{2}}$.

3. The composite material of claim 2 wherein said mixture of powders comprises by weight, about 1 to about 2 parts of said aluminum powder to about one part said boric oxide.

4. The composite material of claim 3 wherein said ratio of aluminum metal powder to said boric oxide powder is greater than about 1.25.

5. The composite material of claim 1 further comprising a reinforcing material dispersed therein, said reinforcing material selected from the group consisting of ceramic fibers, whiskers and platelets.

6. A hard and tough ceramic composite material of a selected shape consisting essentially of intimately mixed aluminum oxide, aluminum boride and aluminum, said composite material resulting from preparing an intimate mixture, by weight, of about 1 to about 2 parts of aluminum powder of about $-325$ mesh to about 1 part powdered anhydrous boric oxide, forming said mixture into said shape and heating said shaped mixture to a temperature from about 1400 to about 1800 degrees C. for about 45 minutes to produce said composite material, said composite material being greater than 98% of theoretical density and having a hardness greater than about 20 GPa and a toughness of at least 6 $MPa.m^{\frac{1}{2}}$.

7. The composite material of claim 6 wherein said ratio of aluminum metal powder to said boric oxide powder is greater than about 1.25.

* * * * *